United States Patent
Bannister et al.

(10) Patent No.: US 6,312,546 B1
(45) Date of Patent: Nov. 6, 2001

(54) LIQUID CRYSTAL DEVICE MANUFACTURING METHODS

(75) Inventors: Robert William Bannister; Ryan Michael Heath, both of Malvern (GB)

(73) Assignees: Sharp Kabushiki Kaisha, Osaka (JP); The secretary of State of Defence in Her Britannic Majesty's Government of the United Kingdom of Great Britain and Northern Ireland, Farnborough (GB)

( * ) Notice: Subject to any disclaimer, the term of this patent is extended or adjusted under 35 U.S.C. 154(b) by 0 days.

(21) Appl. No.: 09/292,861

(22) Filed: Apr. 16, 1999

(30) Foreign Application Priority Data

Apr. 17, 1998 (GB) .................................................. 9808221

(51) Int. Cl.$^7$ .......................... B44C 1/165; B32B 31/20; B02F 1/1339; C03C 27/00; B05D 5/12

(52) U.S. Cl. .......................... 156/230; 156/252; 156/240; 156/241; 156/247; 156/289; 349/1; 349/92; 349/155; 349/187; 428/195; 427/163.1; 427/163.3; 427/58; 427/108

(58) Field of Search .................................... 156/230, 232, 156/234, 235, 240, 241, 247, 277, 289; 428/195, 201, 414, 1.1; 430/20, 200; 349/1, 58, 92, 123, 155, 156, 157, 187; 427/146, 147, 148, 163.1, 163.3, 164, 58, 96, 108

(56) References Cited

U.S. PATENT DOCUMENTS

| | | | |
|---|---|---|---|
| 5,130,831 | * 7/1992 | Kohara et al. | 359/81 |
| 5,494,730 | * 2/1996 | Calhoun et al. | 428/164 |
| 5,593,802 | 1/1997 | Sato et al. | 430/20 |
| 5,710,097 | 1/1998 | Staral et al. | 503/227 |
| 5,838,413 | * 11/1998 | Matoba et al. | 349/155 |
| 5,985,694 | * 11/1999 | Cho | 438/108 |

FOREIGN PATENT DOCUMENTS

| | | |
|---|---|---|
| 19649411 | 11/1996 | (DE) . |
| 2336443 | 10/1999 | (GB) . |
| 61032035 | 2/1986 | (JP) . |
| 2012128 | 1/1990 | (JP) . |
| 9750016 | 12/1997 | (WO) . |

OTHER PUBLICATIONS

English abstract of Japanese Patent No. JP61032035, Published Feb. 14, 1986.

English abstract of Japanese Patent No. JP2012128, Published Jan. 17, 1990.

Search Report for Application No. GB–9808221.7; Dated Jul. 15, 1998.

\* cited by examiner

*Primary Examiner*—Richard Crispino
*Assistant Examiner*—J. A. Lorengo
(74) *Attorney, Agent, or Firm*—Renner, Otto, Boisselle & Sklar, LLP

(57) ABSTRACT

In a method of manufacturing a ferroelectric liquid crystal device, the following steps are applied in order to effect spacing apart of two substrates and by spacers. The spacers are applied to a surface of a transfer member, and the transfer member is then pressed onto a receiving surface of one of the substrates. The transfer member is then removed so as to transfer the spacers from the transfer member to the receiving surface at the required positions. Finally the other substrate is pressed onto the spacers on the receiving surface so as to form an assembly of the two substrates spaced apart by the spacers. Such a sequence of steps enables the spacers to be placed in the required positions in a particularly straightforward manner, whilst minimising the number of fabrication steps used in the process.

17 Claims, 4 Drawing Sheets

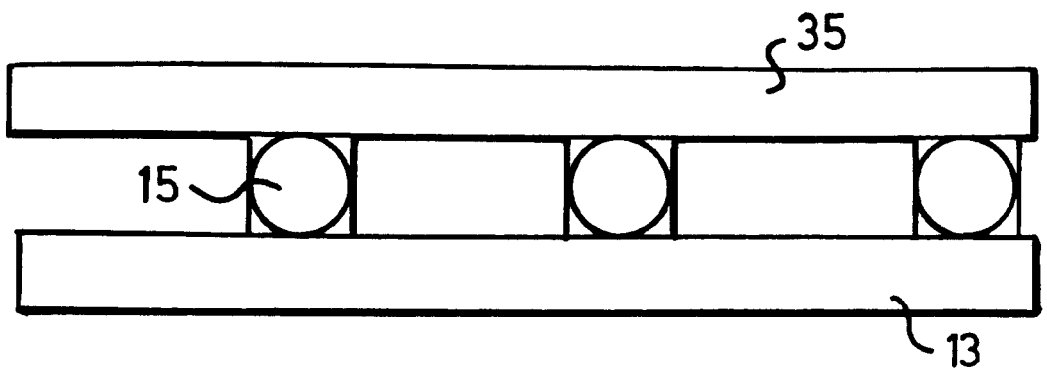
F I G. 11
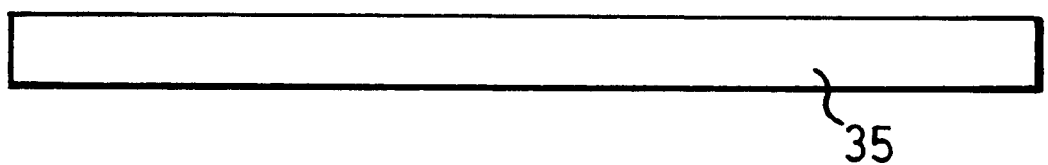
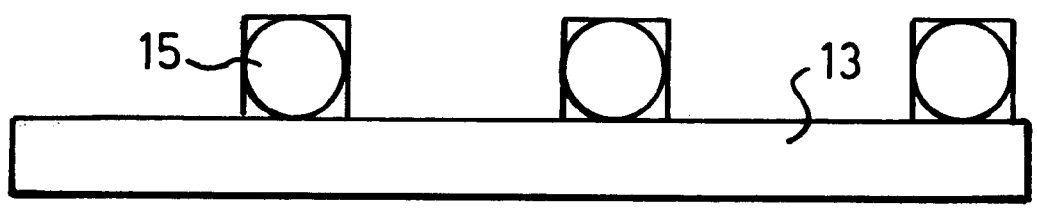
F I G. 12

LIQUID CRYSTAL DEVICE MANUFACTURING METHODS

TECHNICAL FIELD OF THE INVENTION

This invention relates to methods of manufacturing liquid crystal devices, and is concerned more particularly with the spacing apart of substrates in such a device. Although not limited to such an application, the invention is particularly applicable to the manufacture of ferroelectric liquid crystal devices.

DISCUSSION OF THE RELATED ART

The surface stabilised ferroelectric liquid crystal device (SSFLCD) possesses the advantage over other liquid crystal devices, such as the twisted nematic liquid crystal device, that it is a bistable device which can be switched between two states by switching pulses of alternate polarity and which will remain in one state in the absence of a switching pulse until a switching pulse of opposite polarity is applied to switch it to the opposite state. By contrast, in operation of a twisted nematic liquid crystal device, a drive signal must be applied continuously to maintain the device in one of its states. It is also a particular advantage of SSFLCD's that the individual switching elements can be passively addressed without requiring an active matrix in which a respective switching transistor is associated with each switching element. By contrast the addressing of conventional twisted nematic devices requires an active matrix in which a respective switching transistor, generally a thin film transistor (TTL), is associated with each switching element, and the fabrication of such an active matrix utilising thin film transistors requires a large number of fabrication steps which increase manufacturing complexity and cost.

As is well known, a conventional SSFLCD typically includes a cell in which a layer of chiral smectic ferroelectric liquid crystal material is contained between two parallel transparent substrates provided on their inside surfaces with electrode structures in the form of row and column electrode tracks which cross one another to form an addressable matrix of switching elements. Such switching elements are typically addressed on a line-by-line basis by applying data pulses in parallel to the column electrode tracks, each data pulse being either a switching pulse or a non-switching pulse, and by applying strobe pulses to the row electrode tracks so as to switch selected switching elements along each row from one state to the other under the effect of the electric field produced by the voltage difference between the data pulse and the strobe pulse applied to the relevant electrode tracks.

Furthermore rubbed alignment layers are provided on the inside faces of the substrates so as to overlie the electrode structures in order to impart a preferred alignment to the molecules of the liquid crystal material in the vicinity of the alignment layers. This ensures that the liquid crystal molecules, when in the chiral tilted smectic phase, are uniformly aligned in microlayers extending perpendicularly to the substrates with the molecules in each microlayer adopting a chevron geometry due to the alignment of the molecules with the alignment layers on both sides of the liquid crystal layer.

In order to ensure that the substrates are accurately aligned in parallel and with the required gap therebetween for containing the liquid crystal material, spacers are provided between the substrates so as to space the substrates apart, and in addition sealing strips are provided at the edges of the substrates in order to connect the substrates together and contain the liquid crystal material in the space between the substrates. The spacers may be in the form of glass or plastic beads which are distributed over the surface of one of the substrates so as to be held between the two substrates when the substrates are pressed together and sealed at their edges. However, since the spacer beads merely physically separate the two substrates rather than being connected to the substrates, they do not prevent some movement apart of the substrates in localised areas as a result of applied mechanical stress, and this can result in degradation of the performance of the device. A typical production process is described in J. Varney, "Automated Assembly of LCD's using UV Adhesives", Japan Display '89, Oct. 16–18, 1989, Kyoto, Japan.

U.S. Patent Publication No. 5,710,097 discloses a method of applying spacers to a substrate in order to improve adhesion to the substrate surface. This method involves bringing a plastic laminate incorporating a spacer film into contact with the substrate surface, and then defining a pattern using a laser to cause local heating to transfer a spacer layer to the substrate only in those areas in which it is required. U.S. Patent Publication No. 5,593,802 discloses a method of forming spacers on a substrate surface by selectively exposing a laminate applied to the surface to ultraviolet light through a mask, the resulting exposed pattern being developed to leave spacers only where required. German Patent Publication No. 19649411A1 discloses a method of applying spacers to a substrate surface using gravity or static electricity to position the spacers in indentations on a master plate prior to depositing the spacers on the substrate surface by polarity reversal. However there are production difficulties in use of all these methods.

It is also known to use so-called active spacers which are in the form of glass or plastic beads coated with a material, or themselves formed of a material, which is intended to melt in response to applied heat. Such active spacers are introduced between the substrates in the manner already described, but an additional heating step is performed after the substrates have been assembled together with the spacers therebetween so as to cause the outer coatings of the spacers to melt and to subsequently set in such a manner as to physically bond the spacers to the two substrates. S. Kasahara et al., Fujitsu Sci. Tech. J., 30,2, pp.148–153 (December 1994) describes the use of active spacers in the form of low melting temperature lead-tin-fluorophosophate glass beads in association with conventional hard spacers, such as silicon dioxide beads. The soft beads are reduced to the size of the largest hard beads when sandwiched between the substrates and heated to an elevated temperature, and, on subsequent hardening when the temperature is reduced, serve to considerably strengthen the cell.

It is also known to provide spacer walls between the substrates at a suitable pitch and running substantially the whole length of the cell. Such walls not only space the substrates apart but also control the flow of liquid crystal material within the cell. These spacer walls are conventionally produced by depositing a layer of photosensitive polyimide on one of the substrates and masking and etching selective parts of the layer so as to leave material only where required to form the spacer walls, prior to assembly together of the two substrates (possibly after deposition of a suitable adhesive layer therebetween). However, since such formation of the spacer walls would affect the corresponding alignment layer, it is necessary either to apply the alignment layer after the spacer walls have been formed or alternatively to effect rubbing of the alignment layer after the spacers have been formed on top of the alignment layer. In either case, however, the formation of such walls involves additional fabrication steps, and in addition the walls may adversely affect the switching characteristics of the device.

SUMMARY OF THE INVENTION

It is an object of the invention to provide a liquid crystal device manufacturing method which ensures that an assembly of two substrates spaced apart by spacers is produced in a straightforward manner.

According to the present invention there is provided a method of manufacturing a liquid crystal device having two substrates spaced apart by spacers, the method including the steps of applying the spacers to a transfer member such that the spacers are received on raised portions of the transfer member whilst not being received on intermediate recessed portions of the transfer member, pressing the transfer member onto a receiving surface of one of the substrates and subsequently removing the transfer member so as to transfer the spacers from the raised portions of the transfer member on to the receiving surface at the required positions, and pressing the other substrate on to the spacers on the receiving surface so as to form an assembly of the two substrates spaced apart by the spacers.

The sequence of steps used for producing the assembly of the substrates spaced apart by the spacers enables the spacers to be placed in the required positions in a particularly straightforward manner. Although the precise positions of the spacers between the substrates is not generally critical, it is important to ensure that a reasonable distribution of spacers is provided between the substrates in order to provide mechanical stability over the complete area of the device, and in order to ensure that the uniformity of the switching characteristics is not adversely affected by too great a concentration of spacers in one area. This method also enables the number of fabrication steps to be minimised which provide for positioning of the spacers and assembly together of the substrates.

In a preferred embodiment of the invention a bonding agent is applied to the transfer member, and the bonding agent is transferred to the receiving surface together with the spacers to provide for bonding of the spacers between the substrates. The application of the bonding agent in this manner is particularly advantageous as it provides for bonding of the spacers to the two substrates in order to increase the robustness of the device, whilst avoiding the need for separate bonding operations for bonding the spacers first to one substrate and then to the other substrate. However embodiments are also contemplated in which the application of a separate bonding agent is unnecessary where either the spacers are not to be bonded to the substrates or the spacers themselves are made of a material which c an bond together the two substrates, possibly after a specific curing step in which heat or light or chemical action is applied to effect curing, or after sufficient time has expired for curing of the material.

Preferably the bonding agent is an adhesive which is adapted to set after assembly of the two substrates spaced apart by the spacers. In this case the adhesive may be an epoxy adhesive, an ultraviolet-setting adhesive or even an adhesive formed of thermoplastics or polymer material. Ideally the adhesive is such that it transfers from the transfer member onto the receiving surface in a straightforward manner and keeps its shape during subsequent processing steps, whilst not adversely affecting the switching properties of the liquid crystal material.

Alternatively the bonding agent may be in the form of a coating on the spacers which is adapted to bond with the substrates after assembly of the substrates spaced apart by the spacers. The use of such active spacers renders the application of a separate adhesive unnecessary as the coating of the spacers itself may serve to bond the spacers to the substrates, possibly after heat has been applied in order to soften the coating.

Whilst the bonding agent may be such that it sets automatically after a predetermined curing period, it is preferred that a specific curing step is applied after assembly of the two substrates spaced apart by the spacers in which heat or light or chemical action is applied to bond the spacers between the substrates.

In a development of the invention the spacers are applied to the transfer member by pressing the transfer member onto a supply surface having spacers thereon so that a proportion of the spacers on the supply surface are transferred to the transfer member. The bonding agent may simultaneously be applied to the transfer member from the supply surface having a layer of bonding agent containing spacers thereon. In this case only the spacers and associated bonding agent in the area of the supply surface contacted by the raised portions will be transferred to the transfer member, and subsequently transferred from the transfer member to the substrate, and there is no need for any special positioning of the spacers on the supply surface. Instead the spacers can be simply distributed over the supply surface in a substantially random manner.

In a further development of the invention, in which the spacers are preferably active spacers and a separate adhesive is not therefore required, the spacers are held on the transfer member by electrostatic attraction. In this case the spacers may be picked up from a supply surface by means of an electrostatic charge of one polarity applied to the transfer member, and may subsequently be transferred from the transfer member to the receiving surface of the substrate by application of an electrostatic charge of the opposite polarity to the transfer member.

In one embodiment of the invention the transfer member has a substantially flat surface having the raised portions thereon which are pressed onto the receiving surface to transfer the spacers thereto after alignment of the transfer member with the receiving surface.

In an alternative embodiment the transfer member is a roller having a curved surface having the raised portions thereon which are pressed onto the receiving surface to transfer the spacers thereto as the transfer member is moved in rolling contact with the receiving surface. The use of such a transfer roller may be of particular advantage in a production process.

The invention also provides a method of manufacturing a liquid crystal device having two substrates spaced apart by spacers, the method including the steps of applying the spacers to a surface of a transfer member, pressing the transfer member on to a receiving surface of one of the substrates and subsequently removing the transfer member so as to transfer the spacers from the transfer member on to the receiving surface at the required positions, and pressing the other substrate on to the spacers on the receiving surface so as to bond each spacer to both of the substrates so as to form an assembly of the two substrates spaced apart by the spacers.

BRIEF DESCRIPTION OF THE DRAWINGS

In order that the invention may be more fully understood, preferred methods in accordance with the invention will now be described, by way of example, with reference to the accompanying drawings, in which:

FIGS. 11 and 12 are explanatory diagrams showing successive steps in a further method in accordance with the invention.

DETAILED DESCRIPTION OF THE INVENTION

Before the preferred manufacturing method in accordance with the invention is described with reference to FIGS. 2 to 7, the typical structure of a ferroelectric liquid crystal cell will be described with reference to FIG. 1. It should be understood that the invention is not limited to the manufacture of a device of this particular structure, but that the structure is described merely as an example of a structure to which the method is applicable.

Figure 1:
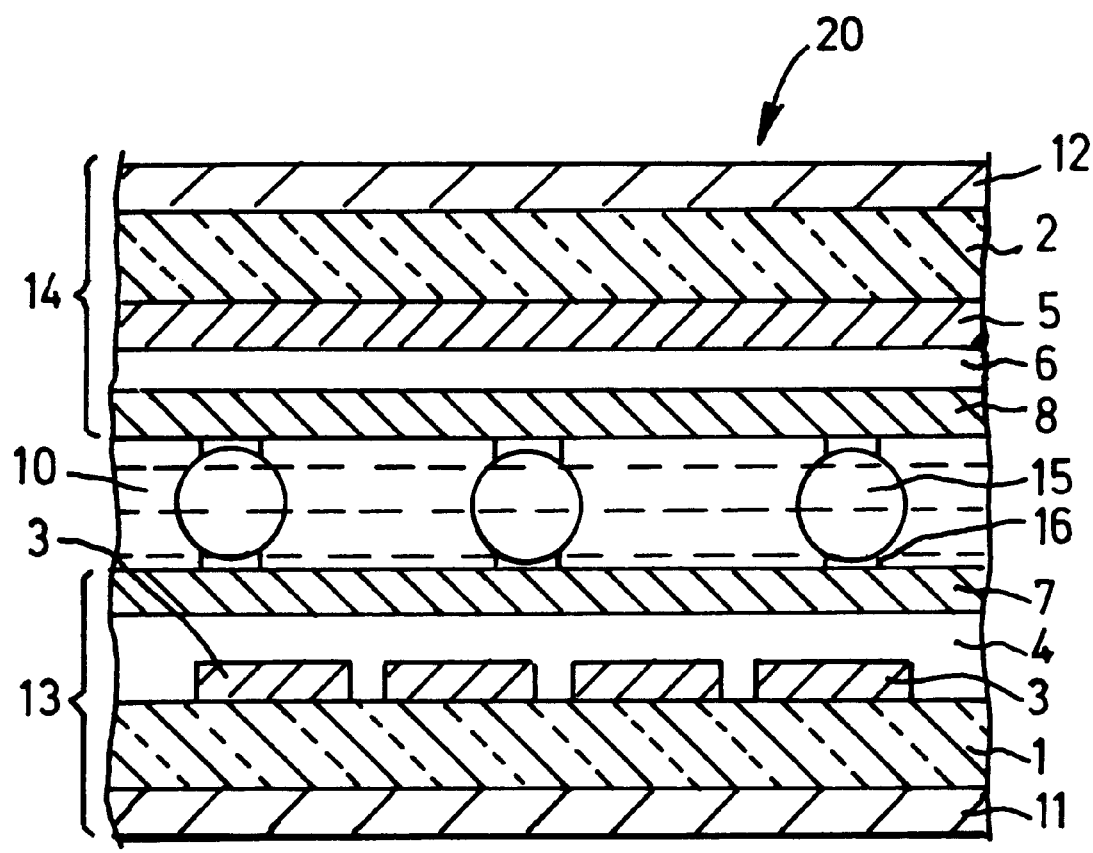
FIG. 1 is a schematic section through part of a ferroelectric liquid crystal cell.

Referring to FIG. 1, which shows a section through only a small part of the cell, the ferroelectric liquid crystal device comprises a cell 20 consisting of a layer 10 of liquid crystal material contained between two parallel substrate structures 13 and 14 spaced apart by spacers 15 consisting of glass or plastics beads bonded to the substrate structures 13 and 14 by adhesive 16.

Each of the substrate structures 13 or 14 consists of a glass substrate 1 or 2 on which electrode structures, made of indium tin oxide (ITO) for example, are formed by known deposition, masking and etching techniques. More particularly a plurality of parallel 100 nm-thick transparent data electrodes 3 are formed on the surface of the substrate 1, and a transparent insulating film 4, made of silicon dioxide ($SiO_2$) for example, is provided on top of the data electrodes 3. Furthermore a plurality of parallel 100 nm-thick transparent strobe electrodes 5, made of the same material as the data electrodes 3, are formed on the surface of the substrate 2 so as to cross the data electrodes 3 at right angles, and a transparent insulating film 6, made of the same material as the insulating film 4, is provided on top of the strobe electrodes 5. Also 70 nm-thick alignment layers 7 and 8 are provided on the inside surfaces of the substrate structures 13 and 14 on top of the insulating films 4 and 6, and a uniaxial alignment treatment, such as rubbing in a required direction by buffing with a soft cloth made of rayon, for example, is applied to the alignment layers 7 and 8 in order to impart a preferred alignment to the molecules of the liquid crystal layer 10 in the vicinity of the alignment layers 7 and 8. The alignment layers 7 and 8 are organic high polymer films, such as a polyimide film, a Nylon (Registered Trade Mark) film, a polyvinyl alcohol film or a silicon dioxide film.

A polarisation layer 11 is formed on the other surface of the glass substrate 1 to the surface on which the data electrodes 3 are formed, and a polarisation layer 12 is formed on the other surface of the glass substrate 2 to the surface on which the strobe electrodes 5 are formed. The polarisation layers 11 and 12 are aligned in such a manner that their respective polarisation axes intersect substantially at right angles and such that a light state or a dark state is produced depending on the switching state of the liquid crystal material within the cell. As is well understood to those skilled in the art, the switching state of the liquid crystal material at the intersections of the data and strobe electrodes 3 and 5 (the pixels) is controlled by the application of data and strobe pulses to the data and strobe electrodes 3 and 5 so that the device may be used to display a moving image.

In the manufacture of such a ferroelectric liquid crystal cell the substrate structures 13 and 14 are initially produced by a series of fabrication steps as previously referred to, culminating in rubbing of the alignment layers 7 and 8 in the required direction. Subsequently, prior to the introduction of the liquid crystal material into the cell 20, it is necessary to assemble the two substrate structures 13 and 14 with the spacers 15 therebetween so as to provide the required spacing between the substrate structures 13 and 14 whilst at the same time mechanically connecting the substrate structures 13 and 14 together. The required steps for carrying out such assembly in accordance with an embodiment of the invention will now be described with reference to FIGS. 2 to 7.

Figure 2:
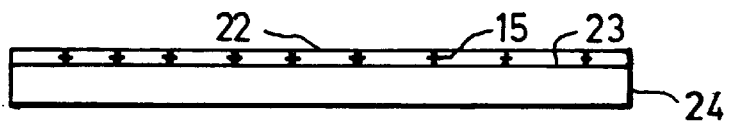
FIGS. 2 to 7 are explanatory diagrams showing successive steps in a method of manufacturing such a cell in accordance with the invention.

Referring to FIG. 2, a layer 22 of adhesive containing spacers 15 is applied to a surface 23 of a supply plate 24. Such a layer 22 may be produced by any method that leaves an even coat of the required thickness of adhesive, for example by spinning the adhesive down on the surface 23 or by a screen printing or any other printing process. The spacers 15 may be added to the adhesive either prior to application of the layer 22 or after the layer 22 has been applied to the surface 23. The adhesive can be any substance which can be subsequently cured, such as an epoxy adhesive, an ultraviolet-setting adhesive, or an adhesive formed from thermoplastics or polymer material.

The spacers 15 may be made of any suitable electrically insulating material which does not lose its shape during subsequent processing. However the spacers 15 preferably consist of beads of glass, ceramic or plastics material, and may comprise rows of such beads forming elongate spacer walls. For example the beads may be of silicon dioxide. Such beads typically have a diameter of about 1.4 $\mu$m. It should be appreciated that, although it is preferred that the spacers 15 should be distributed reasonably evenly in the layer 22, it is not necessary for the spacers 15 to be completely evenly spaced.

Figure 3:
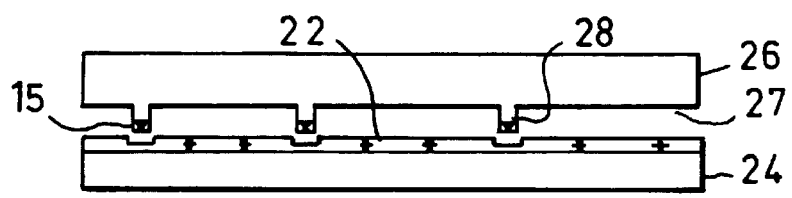

Referring to FIG. 3 a transfer plate 26 has a patterned surface 27 having raised portions 28 at locations corresponding to the positions in which it is required to place the spacers 15 between the substrate structures of the liquid crystal cell. Although not apparent from the figures, the raised portions 28 preferably extend substantially from end to end of the cell with the object of forming a series of parallel spacer walls which control the flow of the liquid crystal material within the cell. The patterned surface 27 of the transfer plate 26 may be produced by applying a layer of photosensitive polymer to the transfer plate 26, and subsequently applying known masking, exposing and etching steps to remove material over the surface except at those locations where the raised portions 28 are to be provided. If necessary, the robustness of the resulting raised formations 28 can be improved by applying a metallisation layer to the patterned surface 27. Alternatively the whole of the transfer plate 26 may be made of metal.

The transfer plate 26 is pressed onto the adhesive layer 22 on the supply plate 24 so that the raised portions 28 sink into the adhesive. The applied pressure, which should not be enough to damage the spacers 15, can be supplied by a vacuum or air or alternatively by mechanical means. The transfer plate 26 and supply plate 24 are then separated, with care being taken to ensure that there is no relative sideways movements between the plates which might serve to spread the adhesive. This results in some of the spacers 15 being transferred from the supply plate 24 to the transfer plate 26 together with a quantity of adhesive from the adhesive layer 22.

Figure 4:
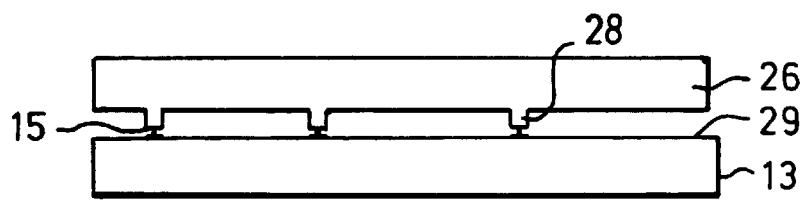
Figure 5:

Referring to FIG. 4 the transfer plate 26, together with the spacers 15 and adhesive appended to the raised portions 28, is then aligned with the substrate structure 13, optionally using alignment features (not shown) on the transfer plate 26, and is pressed down so that the spacers 15 and adhesive on the raised formations 28 contact the receiving surface 29 of the substrate structure 13. The transfer plate 26 is then removed leaving the spacers 15 and adhesive on the receiving surface 29 of the substrate structure 13, as shown in FIG. 5. If required a further transfer process, similar to that already described above with reference to FIGS. 2 to 5, can be used to transfer spacers and adhesive to the other substrate structure 14 also, so that spacers are provided on both substrate structures 13 and 14 prior to connection together of the two substrate structures.

Figure 6:
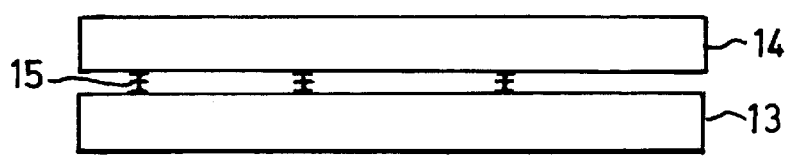
Figure 7:
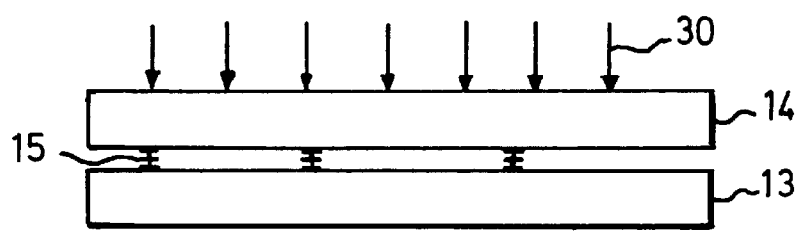

Referring to FIG. 6 the two substrate structures 13 and 14 are then aligned with one another and pressed together so that the spacers 15 previously applied to the substrate structure 13 (and also, if appropriate, those applied to the substrate structure 14) are sandwiched between the two substrate structures. Where a large number of closely spaced spacers 15 are deposited along a line by each raised portion 28, the adhesive will fill the gap between the spacers so as to form a continuous spacer wall, and a number of parallel spacer walls will be formed corresponding to the number of raised portions 28 on the transfer plate 26. Finally heat and pressure, as shown diagrammatically by the arrows 30 in FIG. 7, are applied to effect curing of the adhesive so that the spacers 15 are firmly bonded to the two substrate structures. Alternatively the adhesive may be cured by the application of light, preferably ultraviolet light, by chemical action, or by pressure, or may simply be left to cure with time. The spacer walls formed in this manner may form parallel walls extending substantially from one end to the other of the cell.

In the above-described transfer process, it is important that the raised portions 28 of the transfer plate 26 have a greater height than the spacers 15 and the adhesive layer 22 so as to make sure that only the raised portions 28 come into contact with the adhesive during the transfer process. Furthermore the width of the raised portions 28 may be slightly greater than the width of the spacers 15 so as to allow for some spreading of adhesive. The spacers 15 will generally be provided on the raised portions 28 of the transfer plate 26 at high density in view of the need to withstand the pressure applied during processing and to form continuous spacer walls with the set adhesive.

Figure 8:
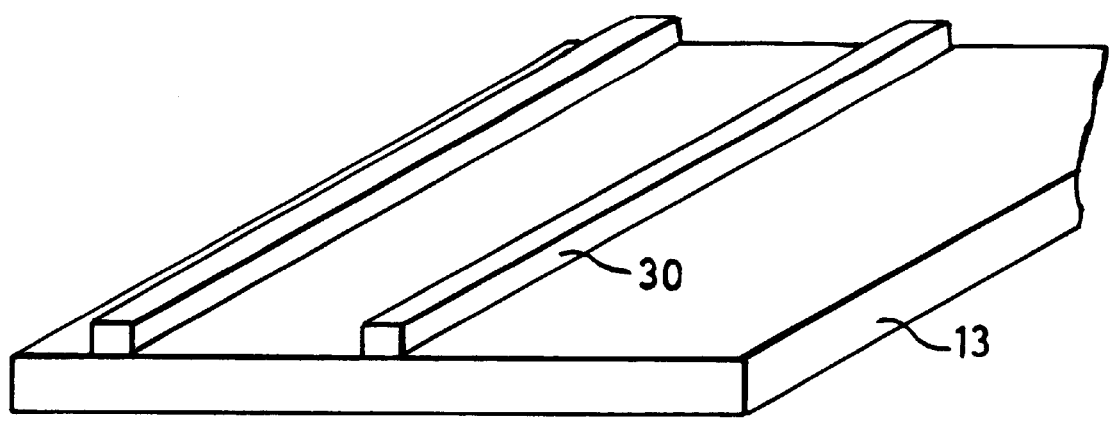
FIGS. 8 and 9 show two alternative spacer arrangements which may be used in a method in accordance with the invention.
Figure 9:
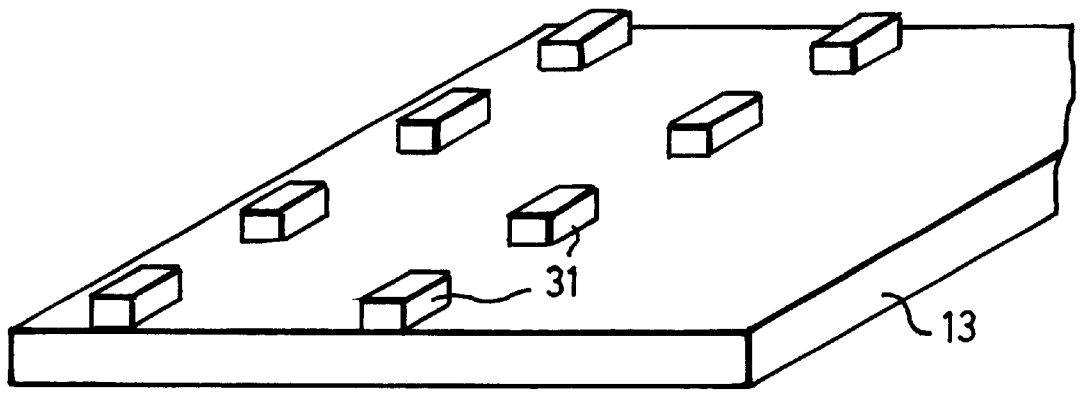

It should be appreciated that the method described above may be used either to produce parallel spacer walls 30 extending from end to end of the cell, as shown in FIG. 8, or alternatively spacer pillars 31 which may be spaced apart and possibly arranged along parallel rows, as shown in FIG. 9. Furthermore, as an alternative to the spacers 15 being transferred to the transfer plate 26 with the adhesive from the supply plate 24, only adhesive need be transferred to the transfer plate 26 from the supply plate 24, the spacers 15 subsequently being applied to the adhesive on the transfer plate 26 by a spraying or blowing process so as to distribute the spacers over the transfer plate.

Figure 10:
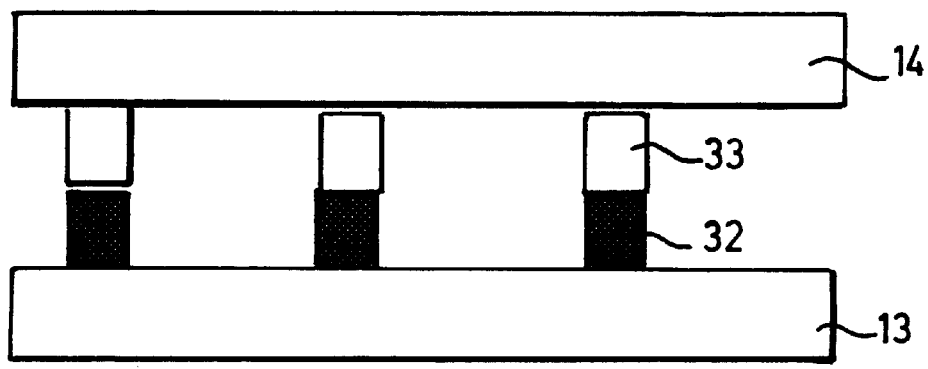
FIG. 10 is an explanatory diagram illustrating a further method in accordance with the invention.

FIG. 10 diagrammatically shows a further spacer wall arrangement which may be produced by a method in accordance with the invention. In this arrangement in-plane electrodes are produced by the application of conductive spacer walls 32 to one of the substrate structures 13, and the application of non-conductive spacer walls 33 to the other substrate structure 14, so as to form a composite wall spacing apart the two substrate structures 13 and 14 when these substrate structures are assembled together.

In a further modification of the method described with reference to FIGS. 2 to 7 above, an additional operational step is incorporated in which a pressure plate 35, made of or coated with a non-stick material such as tetrafluoroethylene, for example, is applied to the spacers 15 on the substrate structure 13, after removal of the transfer plate 26, in order to press the spacers 15 and associated adhesive down on to the surface of the substrate structure 13 without the adhesive adhering to the pressure plate 35, as shown in FIG. 11. When the spacers 15 and adhesive have been compressed to the required extent, the adhesive is cured, for example by the application of heat through the pressure plate 35 or by the application of ultraviolet light, so as to form spacer walls of the required thickness. After curing the pressure plate 35 is lifted clear of the walls leaving the spacers 15 in position on the substrate structure 13 as shown in FIG. 12. The two substrate structures may then be assembled together in similar manner to conventional spacer wall arrangements in accordance with the prior art in which spacer walls are formed from polyimide by photolithography. However this method possesses the advantage over the prior art method using photolithography in that it requires less process steps. This method may also be used to obviate the problem whereby differences in alignment of liquid crystal material are produced in the vicinity of the spacer walls which might adversely effect the switching characteristics of the device.

In a non-illustrated alternative method, the spacers and adhesive are transferred to the substrate structure by means of a printing roller (similar to a PI coater used in the application of patterned alignment films) having raised portions on its outer curved surface for receiving the spacers and adhesive when the roller is placed in rolling contact with an adhesive layer containing spacers on a supply surface. Alternatively the adhesive layer may be applied to the raised portions of the roller as the raised portions move past an adhesive applicator or through an adhesive bath, and the spacers may subsequently be applied to the adhesive on the raised portions. In any event the spacers and adhesive on the raised portions are subsequently transferred to the receiving surface of the substrate structure by moving the roller in rolling contact with the receiving surface. The adhesive may then be cured in the manner previously described. In this case the required patterning on the printing roller may be produced by etching, embossing, fabrication or some other method.

In a further non-illustrated alternative method in accordance with the invention, the spacers are in the form of glass or plastic beads coated with a thermoplastics material which is capable of being softened and re-cured under the effect of heat. Initially the spacers are provided on a supply plate, but without being embedded in an adhesive layer as shown in FIG. 2. Some of the spacers are then transferred to elongate raised portions of a transfer plate, similar to the transfer plate 26 of FIG. 3 except that a static charge is applied to the plate in order to attract the spacers to the plate. The transfer plate is then raised clear of the supply plate so that the spacers attracted to the raised portions of the transfer plate by static attraction are removed from the supply plate. The spacers on the raised portions of the transfer plate are then transferred to the receiving surface of the substrate structure by pressing the transfer plate onto the substrate structure and reversing the polarity of the static charge applied to the transfer plate so as to release the spacers from the raised portions of the transfer plate. The substrate structure is then heated so as to soften the outer coating of the spacers and cause the spacers to stick to the receiving surface. The transfer plate is then raised clear of the substrate structure leaving the spacers behind on the receiving surface, and finally the other substrate structure is placed on top of the spacers on the receiving surface, and pressure and heat are applied to cause the spacers to be bonded between the two substrate structures on curing of the outer coating of the spacers.

In a further modification of the method, the spacers are applied to the substrate structure using a roller to effect printing of the spacers on the receiving surface of the substrate structure in a manner rather similar to laser printing.

In all the above-described methods, the spacers are electrically insulating so as to prevent electrical conduction between the two substrate structures. However it is possible to make use of similar methods to position electrically conductive spacers between two substrates in order to provide fine pitch electrical interconnections between electrically conductive tracks on the two substrates.

What is claimed is:

1. A method of manufacturing a liquid crystal device having two substrates (13, 14) spaced apart by spacers (15), the method including the steps of applying the spacers (15) to a transfer member (26) such that the spacers (15) are received on raised portions (28) of the transfer member (26) whilst not being received on intermediate recessed portions of the transfer member (26), pressing the transfer member (26) onto a receiving surface (29) of one of the substrates (13) and subsequently removing the transfer member (26) so as to transfer the spacers (15) from the raised portions (28) of the transfer member (26) on to the receiving surface (29) at the required positions, and pressing the other substrate (14) on to the spacers (15) on the receiving surface (29) so as to form an assembly of the two substrates (13, 14) spaced apart by the spacers (15).

2. A method according to claim 1, wherein a bonding agent (22) is applied to the transfer member (26), and the bonding agent (22) is transferred to the receiving surface (29) together with the spacers (15) to provide for bonding of the spacers (15) between the substrates (13, 14).

3. A method according to claim 2, wherein the bonding agent (22) is an adhesive which is adapted to set after assembly of the two substrates (13, 14) spaced apart by the spacers (15).

4. A method according to claim 2, wherein the bonding agent is a coating on the spacers (15) which is adapted to bond with the substrates (13, 14) after assembly of the two substrates (13, 14) spaced apart by the spacers (15).

5. A method according to claim 2, wherein a curing step is applied after assembly of the two substrates (13, 14) spaced apart by the spacers (15) in which a curing operation is effected to bond the spacers (15) between the substrates (13, 14).

6. A method according to claim 1, wherein the spacers (15) are applied to the transfer member (26) by pressing the transfer member (26) onto a supply surface (24) having spacers (15) thereon so that a proportion of the spacers (15) on the supply surface (24) are transferred to the transfer member (26).

7. A method according to claim 6, wherein a bonding agent is simultaneously applied to the transfer member (26) from the supply surface (24) having a layer (22) of bonding agent containing spacers (15) thereon.

8. A method according to claim 1, wherein the spacers (15) are applied to the transfer member (26) after application of a layer (22) of bonding agent to the transfer member (26).

9. A method according to claim 1, wherein the spacers (15) are held on the transfer member (26) by electrostatic attraction.

10. A method according to claim 1, wherein the transfer member (26) has a substantially flat surface having said raised portions (28) thereon which are pressed onto the receiving surface (29) to transfer the spacers (15) thereto after alignment of the transfer member (26) with the receiving surface (29).

11. A method according to claim 1, wherein the transfer member (26) is a roller having a curved surface having said raised portions (28) thereon which are pressed onto the receiving surface (29) to transfer the spacers (15) thereto as the transfer member (26) is moved in rolling contact with the receiving surface (29).

12. A method according to claim 11, wherein, prior to application to the receiving surface (29), the transfer member (26) is moved in rolling contact with a supply surface (24) having spacers (15) thereon in order to transfer a proportion of the spacers (15) to the raised portions (28) of the transfer member (26).

13. A method according to claim 1, wherein the spacers (15) are transferred to the receiving surface (29) along parallel lines so as to form elongate spacer walls (30) between the substrate structures (13, 14).

14. A method according to claim 1, wherein an alignment layer is applied to at least one of the substrates (13, 14) prior to assembly of the two substrates (13, 14) spaced apart by the spacers (15).

15. A method of manufacturing a liquid crystal device having two substrates (13, 14) spaced apart by spacers (15), the method including the steps of applying the spacers (15) to a surface of a transfer member (26), pressing the transfer member (26) on to a receiving surface (29) of one of the substrates (13) and subsequently removing the transfer member (26) so as to transfer the spacers (15) from the transfer member (26) on to the receiving surface (29) at the required positions, pressing the other substrate (14) on to the spacers (15) on the receiving surface (29) and bonding each spacer (15) to both of the substrates (13, 14) so as to form an assembly of the two substrates (13, 14) spaced apart by the spacers (15) bonded between the substrates, wherein the spacers (15) are received on raised portions (28) of the transfer member (26) whilst not being received on intermediate recessed portions of the transfer member (26).

16. A method of manufacturing a liquid crystal device having two substrates (13, 14) spaced apart by spacers (15), the method including the steps of applying the spacers (15) to a surface of a transfer member (26), pressing the transfer member (26) on to a receiving surface (29) of one of the substrates (13) and subsequently removing the transfer member (26) so as to transfer the spacers (15) from the transfer member (26) on to the receiving surface (29) at the required positions, pressing the other substrate (14) on to the spacers (15) on the receiving surface (29) and bonding each spacer (15) to both of the substrates (13, 14) so as to form an assembly of the two substrates (13, 14) spaced apart by the spacers (15) bonded between the substrates, wherein the spacers (15) are applied to the transfer member (26) after application of a layer (22) of bonding agent to the transfer member (26).

17. A method of manufacturing a liquid crystal device having two substrates (13, 14) spaced apart by spacers (15), the method including the steps of applying the spacers (15)

to a surface of a transfer member (26), pressing the transfer member (26) on to a receiving surface (29) of one of the substrates (13) and subsequently removing the transfer member (26) so as to transfer the spacers (15) from the transfer member (26) on to the receiving surface (29) at the required positions, pressing the other substrate (14) on to the spacers (15) on the receiving surface (29) and bonding each spacer (15) to both of the substrates (13, 14) so as to form an assembly of the two substrates (13, 14) spaced apart by the spacers (15) bonded between the substrates, wherein the transfer member (26) is a roller having a curved surface which is pressed onto the receiving surface (29) to transfer the spacers (15) thereto as the transfer member (26) is moved in rolling contact with the receiving surface (29).

* * * * *